3,342,860
N-SUBSTITUTED CINNAMAMIDES
Carter N. Brown and Earle M. Van Heyningen, Indianapolis, Ind., assignors to Eli Lilly and Company, Indianapolis, Ind., a corporation of Indiana
No Drawing. Filed Apr. 6, 1964, Ser. No. 357,771
5 Claims. (Cl. 260—559)

This invention relates to new derivatives of cinnamic acid. More particularly, it is concerned with β-alkyl-3,4,5-trimethoxycinnamic acids and the N-substituted amides thereof, and with methods for their preparation.

The compounds of this invention are represented by the formula:

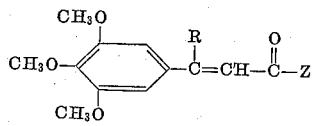

wherein R is methyl or ethyl; Z is —OH or

$R^1$, when taken separately, is hydrogen or a $C_1$-$C_3$ alkyl radical; $R^2$, when taken separately, is $C_1$-$C_3$ alkyl, —$CH_2CH_2OCH_3$, —$CH_2CH_2CH_2OCH_3$, cyclopropyl, or methylcyclopropyl; and $R^1$ and $R^2$, when taken together with the nitrogen atom to which they are attached, form a pyrrolidino or morpholino ring structure.

Preparation of the β-substituted 3,4,5-trimethoxycinnamic acids and the N-substituted amides derived therefrom can be readily accomplished proceeding from any one of a number of available reagents. For example, gallic acid (3,4,5-trihydroxybenzoic acid) may be used as a convenient starting material for the synthesis. As the first step, trimethylgallic acid is prepared by methylating gallic acid with dimethyl sulfate under basic conditions (Organic Syntheses, Collective Volume I, 537 (1941)). In the second step, trimethylgallic acid is refluxed with an excess of thionyl chloride to produce trimethylgalloyl chloride, which is separated from the reaction product mixture in a conventional manner. Diethyl malonate and trimethylgalloyl chloride are then reacted in the presence of magnesium ethylate to yield diethyl 3,4,5-trimethoxybenzoylmalonate. This ester is hydrolyzed and decarboxylated by refluxing with a mixture of glacial acetic acid and concentrated sulfuric acid to yield 3,4,5-trimethoxyacetophenone (Organic Syntheses, Collective Volume IV, 708 (1963)), an intermediate useful for synthesizing the β-methyl compounds of the invention.

For the synthesis of the adjacent ketone, 3,4,5-trimethoxypropiophenone, an intermediate useful in preparing the β-ethyl compounds of the invention, the procedure of Cason, J. Am. Chem. Soc., 68, 2080 (1946), is conveniently employed. Diethylcadmium reagent is prepared by treating ethyl magnesium bromide in anhydrous ether with anhydrous cadmium chloride. The ether solvent is then replaced with dry benzene. A benzene solution of trimethylgalloyl chloride is then added rapidly to the benzene solution of diethylcadmium reagent. The reaction, which is somewhat exothermic, is carried out with stirring, and the mixture is held at a temperature of about 40–45° C. for a period of about 1.5 hours. The reaction product mixture is worked up in a conventional manner, suitably by agitating with dilute aqueous acid, separating the layers, washing the organic layer with mild dilute aqueous alkali to remove traces of acid, evaporating substantially to dryness, and crystallizing the residue from petroleum ether to obtain the desired 3,4,5-trimethoxypropiophenone.

The substituted ketones, available by the above procedures or commercially, are used to prepare the β-alkyl-3,4,5-trimethoxycinnamic acids. One method of preparation is the aldol condensation procedure of Dunnavant and Hauser, J. Org. Chem., 25, 506 (1960). The synthesis is carried out in the following manner. To a stirred suspension of lithium amide in anhydrous liquid ammonia is added a solution of ethyl acetate in ether, stirring being continued thereafter for about 20 minutes. The substituted ketone is then added in a period of one minute and the reaction mixture stirred for about an hour. The reaction product mixture is worked up by neutralizing with solid ammonium chloride and gradually replacing the liquid ammonia with ether. When the replacement is complete, cold water is added, and the ether layer containing the crude product is separated and washed successively with dilute mineral acid, dilute sodium bicarbonate solution, and water to remove impurities and undesired by-products. The ether solution is dried, the solvent removed in vacuo, and the residue distilled at reduced pressure to yield an ester, ethyl β-alkyl-β-hydroxy-3,4,5-trimethoxydihydrocinnamate. This ester is dehydrated by refluxing with acetic anhydride, anhydrous formic acid, a mixture of acetic anhydride and acetyl chloride, or a like dehydrating agent. The unsaturated ester thus obtained, ethyl β-alkyl-3,4,5-trimethoxycinnamate, is hydrolyzed by refluxing with a strong base in aqueous-ethanol solution. Strong bases suitable for accomplishing this hydrolysis include sodium hydroxide, potassium hydroxide, and the like. The hydrolysis mixture is then acidified with aqueous mineral acid to precipitate the β-alkyl-3,4,5-trimethoxycinnamic acid, which is conveniently recrystallized from a mixture of benzene and petroleum ether.

Another method of synthesizing the substituted cinnamic acids is by the well-known Reformatsky reaction (Shriner, Org. Reactions, 1, 1 (1942)). In this method a mixture of activated zinc and anhydrous tetrahydrofuran is stirred and brought to reflux and a solution of ethyl bromoacetate and substituted ketone in a mixture of equal volumes of dry benzene and tetrahydrofuran is added at such a rate as to maintain a good rate of reflux. After the addition is complete and the reaction mixture has refluxed for an hour, it is cooled and an excess of saturated ammonium chloride solution is added. The mixture, which partly solidifies, is extracted with ether several times and the ether extracts washed with water and dried. The dried solution is distilled in vacuo to yield the ester, ethyl β-alkyl-β-hydroxy-3,4,5-trimethoxycinnamate. The ester is dehydrated and hydrolyzed in the same manner as described previously to yield the β-alkyl-3,4,5-trimethoxycinnamic acid.

A third method of preparing the β-alkyl-3,4,5-trimethoxycinnamic acids is by the use of the phosphonate carbanion technique of Wadsworth and Emmons, J. Am. Chem. Soc., 83, 1737 (1961), in which phosphonate carbanions containing electron-withdrawing groups are reacted with ketones in an aprotic solvent.

Illustratively, a mixture of triethyl phosphonoacetate and sodium hydride (50 percent dispersion in mineral oil) is stirred and reacted in a suitable inert solvent, preferably 1,2-dimethoxyethane, at room temperature until hydrogen gas ceases to be evolved. Suitable solvents include those in which the solvent molecules possess no reactive and replaceable hydrogen atoms. To the resulting mixture is added a solution of 3,4,5-trimethoxyacetophenone, preferably in the same solvent, and the mixture is stirred for a time sufficient to allow the reaction to go to completion. The ester formed in this manner, ethyl β-methyl-3,4,5-trimethoxycinnamate, is hydrolyzed and the free acid is recovered as set forth above.

From the cinnamic acids prepared by these procedures are synthesized the N-substituted cinnamamides. Illustratively, β-methyl-3,4,5-trimethoxycinamic acid, in the form of its acid halide, is reacted with cyclopropylamine in an inert diluent to yield N-cyclopropyl-β-methyl-3,4,5-trimethoxycinnamamide. In a preferred embodiment the cinnamic acid chloride and an excess of cyclopropylamine are dissolved in benzene and allowed to react overnight at about room temperature. The excess of cyclopropylamine acts as an acid acceptor, and neutralizes the hydrogen chloride formed during the reaction. Suitable diluents, in addition to benzene, include ether, acetone, ethyl acetate, benzene, dimethylacetamide, and similar solvents which are unreactive toward the reactants and the end product. When the reaction is complete, the reaction product solution is washed with water and dried. The benzene diluent is removed in vacuo and the residue is recrystallized from a suitable solvent such as a mixture of benzene and petroleum ether.

The new substituted cinnamic acids have the unusual property of inhibiting the growth of certain protozoa, such as Tetrahymena pyriformis. The new cinnamamides of the present invention have unique, unexpected, and highly desirable tranquilizing properties, while at the same time lacking the usually concomitant and undesirable muscle flaccidity-causing and general body-relaxing properties shown by other tranquilizing drugs. The neuro-sedative properties of the subject compounds have been demonstrated by tests in male rats made aggressive and hyperirritable by mechanical ablation of the septum or by mechanical ablation of the hippocampus. When administered these drugs, such test animals lose their aggressiveness and responsiveness to an irritating sensory stimulus such as a puff of air, and give the appearance of normal, alert rats. Additional pharmacological evaluation of the compounds carried out in cats indicates that the blood pressure and heart rate are unaffected by the cinnamamides of this invention.

The following examples are presented to describe the invention more clearly, but are not to be construed as exclusive embodiments thereof.

EXAMPLE 1

β-Methyl-3,4,5-trimethoxycinnamic acid

To 400 ml. of well-dried 1,2-dimethoxyethane contained in a three-neck flask equipped with mechanical stirrer, thermometer, drying tube (calcium chloride), and dropping funnel were carefully added 22.9 g. (0.477 mole) of 50 percent sodium hydride dispersion in mineral oil, and the mixture was stirred for about 20 minutes. To the suspension so formed were added 106.9 g. (0.477 mole) of triethyl phosphonoacetate dropwise while maintaining the temperature close to room temperature or just below by means of an ice bath. After the addition, stirring was continued for about 3 hours, at the end of which time tests showed that the evolution of hydrogen had ceased. A solution of 100 g. (0.477 mole) of 3,4,5-trimethoxyacetophenone in 1,2-dimethoxyethane was then added dropwise with stirring, the temperature being maintained below 25–30° C., and stirring was continued for a total of approximately 24 hours at room temperature.

The reaction product mixture was worked up by diluting with two volumes of water and extracting several times with ether. The ether extracts were combined and evaporated in vacuo. The crude ester-mineral oil mixture obtained thereby was dissolved in aqueous ethanol, and the ester was saponified by stirring and heating under reflux overnight with an aqueous 20 percent potassium hydroxide solution. The saponification product was concentrated in vacuo to remove the ethanol-water solvent, and the resulting cake was dissolved in water and washed several times with petroleum ether to remove the mineral oil. The water layer was filtered, chilled with ice, and acidified with 6 N hydrochloric acid, care being taken to avoid a large excess of acid, so that the acid product precipitated in crystalline form rather than as a sticky gum. The white-to-cream colored solid was filtered and dried in a vacuum oven at 60° C. It was then dissolved in benzene, diluted with petroleum ether to incipient crystallization, and allowed to crystallize. The product, β-methyl-3,4,5-trimethoxycinnamic acid, melted at about 155.5–156° C. and weighed about 60 g.

*Analysis.*—Calc.: C, 61.89; H, 6.39. Found: C, 61.75; H, 6.47.

By reworking the filtrate, a second crop of crystalline product weighing about 13 g. and having a melting point of about 154–155° C. was obtained.

EXAMPLE 2

N-cyclopropyl-β-methyl-3,4,5-trimethoxycinnamamide

In a flask fitted with condenser and drying tube, 25.2 g. (0.1 mole) of finely ground β-methyl-3,4,5-trimethoxycinnamic acid were suspended in 250 ml. of dry benzene. To the suspension were added 13.3 g. (0.105 mole) of oxalyl chloride, and the mixture was heated gently on the steam bath for an hour. Gas evolved during this time and the suspended solid went into solution. The benzene and unreacted oxalyl chloride were removed by evaporation in vacuo with gentle warming on the steam bath. The solid thus obtained was dissolved in benzene and the benzene again removed in vacuo. This process of addition of benzene and removal in vacuo was repeated until the odor of oxalyl chloride could no longer be detected.

The crude acid chloride thus obtained was dissolved in about 200 ml. of dry benzene, and the solution was placed in a three-neck flask protected from moisture and equipped with a mechanical stirrer. To the solution were added, with slight cooling, 11.4 g. (0.2 mole) of cyclopropylamine dissolved in a small amount of benzene, and the mixture was stirred overnight at room temperature. It was then poured into an equal volume of water and shaken well; the layers were separated, and the benzene layer was washed with a small amount of water. The aqueous layers were discarded. The benzene solution was cleared by shaking briefly with anhydrous sodium sulfate, then filtering. The benzene solution was treated with charcoal, filtered, and evaporated to dryness in vacuo. The residue was dissolved in a small amount of benzene, diluted with petroleum ether to turbidity, and then chilled. N-cyclopropyl-β-methyl - 3,4,5 - trimethoxycinnamamide crystallized as a near-white product having a melting point of about 122–124° C. Yield, 4.6 g., about 77 percent of theory.

*Analysis.*—Calc.: C, 65.95; H, 7.27; N, 4.81. Found: C, 66.18; H, 7.52; N, 4.71.

EXAMPLE 3

4-(β-methyl-3,4,5-trimethoxy-cinnamoyl)morpholine

Following the procedure of Example 2 and using β-methyl-3,4,5-trimethoxycinnamoyl chloride and morpholine as reactants, 4-(β-methyl-3,4,5-trimethoxycinnamoyl) morpholine was obtained having a melting point of about 92–93° C. after recrystallization from a mixture of benzene and petroleum ether.

*Analysis.*—Calc.: C, 63.53; H, 7.21; N, 4.36. Found: C, 63.61; H, 7.21; N, 4.23.

EXAMPLE 4

N-cyclopropyl-N-isopropyl-β-methyl-3,4,5-trimethoxycinnamamide

Following the procedure of Example 2 and using β-methyl-3,4,5-trimethoxycinnamoyl chloride and isopropylcyclopropylamine as the reactants, N-cyclopropyl-N-isopropyl - β - methyl-3,4,5-trimethoxycinnamamide was obtained having a melting point of about 82–83° C. after recrystallization from a mixture of benzene and petroleum ether.

*Analysis.*—Calc.: C, 68.44; H, 8.16; N, 4.20. Found: C, 67.70; H, 7.93; N, 3.92.

EXAMPLE 5

1-(β-methyl-3,4,5-trimethoxycinnamoyl)pyrrolidine

Following the procedure of Example 2 and using β-methyl-3,4,5-trimethoxycinnamoyl chloride and pyrrolidine as the reactants, 1-(β-methyl-3,4,5-trimethoxycinnamoyl)pyrrolidine was obtained having a melting point of about 99.5–100° C. after recrystallization from a mixture of petroleum ether and benzene.

Analysis.—Calc.: C, 68.86; H, 7.59; N, 4.59. Found: C, 67.93; H, 7.79; N, 4.59.

EXAMPLE 6

N-isopropyl-β-methyl-3,4,5-trimethoxycinnamamide

Following the procedure of Example 2 and using β-methyl-3,4,5-trimethoxycinnamoyl chloride and isopropylamine as reactants, N-isopropyl-β-methyl-3,4,5-trimethoxycinnamamide was obtained having a melting point of about 107.5–108.5° C. after recrystallization from a mixture of petroleum ether and benzene.

Analysis.—Calc.: C, 65.51; H, 7.90; N, 4.78. Found: C, 65.22; H, 8.14; N, 4.72.

EXAMPLE 7

N-cyclopropyl-N-methyl-β-methyl-3,4,5-trimethoxycinnamamide

Following the procedure of Example 2 and using β-methyl-3,4,5-trimethoxycinnamoyl chloride and N-methylcyclopropylamine as reactants, N-cyclopropyl-N-methyl-β-methyl-3,4,5-trimethoxycinnamamide was obtained having a melting point of about 94–96° C. after recrystallization from a mixture of benzene and petroleum ether.

Analysis.—Calc.: C, 66.86; H, 7.59; N, 4.59. Found: C, 66.64; H, 7.72; N, 4.53.

EXAMPLE 8

N,N-di-n-propyl-β-methyl-3,4,5-trimethoxycinnamamide

Following the procedure of Example 2 and using β-methyl-3,4,5-trimethoxycinnamoyl chloride and di-n-propylamine as reactants, N,N-di-n-propyl-β-methyl-3,4,5-trimethoxycinnamamide was obtained as a viscous oil.

Analysis.—Calc.: C, 68.03; H, 8.71; N, 4.18. Found: C, 68.31; H, 8.72; N, 4.08.

EXAMPLE 9

N-(3-methoxypropyl)-β-methyl-3,4,5-trimethoxycinnamamide

Following the procedure of Example 2 and using β-methyl-3,4,5-trimethoxycinnamoyl chloride and 3-methoxypropylamine as reactants, N-(3-methoxypropyl)-β-methyl-3,4,5-trimethoxycinnamamide was obtained having a melting point of about 95–96° C. after recrystallization from a mixture of benzene and petroleum ether.

Analysis.—Calc.: C, 63.14; H, 7.79; N, 4.33. Found: C, 63.31; H, 7.90; N, 4.06.

EXAMPLE 10

N-(2-methoxyethyl)-β-methyl-3,4,5-trimethoxycinnamamide

Following the procedure of Example 2 and using β-methyl-3,4,5-trimethoxycinnamoyl chloride and 2-methoxyethylamine as reactants, N-(2-methoxyethyl)-β-methyl-3,4,5-trimethoxycinnamamide was obtained having a melting point of about 98–98.5° C. after recrystallization from a mixture of benzene and petroleum ether.

Analysis.—Calc.: C, 62.12; H, 7.49; N, 4.53. Found: C, 62.72; H, 7.91; N, 4.37.

EXAMPLE 11

N-methyl-β-methyl-3,4,5-trimethoxycinnamamide

β-methyl-3,4,5-trimethoxycinnamoyl chloride was prepared by the reaction of 5.0 g. (0.0198 mole) of β-methyl-3,4,5-trimethoxycinnamic acid and 8.0 g. (0.063 mole) of oxalyl chloride following the procedure of Example 2, supra.

The crude acid chloride thus obtained was dissolved in 100 ml. of dry benzene in a three-neck flask protected from moisture and equipped with a mechanical stirrer. Anhydrous methylamine was passed into the stirred solution via a gas inlet tube for about 30 minutes, and stirring was continued overnight at ambient room temperature. The reaction product mixture was worked up according to the procedure of Example 2 to yield N-methyl-β-methyl-3,4,5-trimethoxycinnamamide having a melting point of about 140–142° C. after recrystallization from benzene.

Analysis.—Calc.: C, 63.38; H, 7.22; N, 5.28. Found: C, 63.16; H, 7.23; N, 5.08.

EXAMPLE 12

N-(2-methylcyclopropyl)-β-methyl-3,4,5-trimethoxycinnamamide

Following the procedure of Example 2 and using β-methyl-3,4,5-trimethoxycinnamoyl chloride and 2-methylcyclopropylamine as reactants, N-(2-methylcyclopropyl)-β-methyl-3,4,5-trimethoxycinnamamide was obtained as a liquid which boiled at about 236–240° C./2.25 mm.

Analysis.—Calc.: C, 66.86; H, 7.59; N, 4.59. Found: C, 66.60; H, 7.82; N, 4.35.

EXAMPLE 13

β-ethyl-3,4,5-trimethoxycinnamic acid

Following the procedure described above for the β-methyl isomer, 3.3 g. (0.0686 mole) of 50 percent sodium hydride suspension in mineral oil were suspended in 150 ml. of dry 1,2-dimethoxyethane, and 15.4 g. (0.0686 mole) of triethyl phosphonoacetate were added, followed by 16.4 g. (0.0686 mole) of 3,4,5-trimethoxypropiophenone dissolved in 50 ml. of 1,2-dimethoxyethane, and the reaction mixture was stirred at room temperature for about 24 hours.

The reaction product mixture was worked up as before and the product, ethyl β-ethyl-3,4,5-trimethoxycinnamate, was taken up in ether. The ether solution was evaporated in vacuo. The crude ester-mineral oil mixture obtained thereby was dissolved in aqueous ethanol and the ester was saponified by stirring and heating under reflux for 4 hours with an aqueous 20 percent potassium hydroxide solution. The saponification product was concentrated in vacuo to remove the ethanol-water solvent, leaving impure β-ethyl-3,4,5-trimethoxycinnamic acid as a light-brown syrup weighing 11.1 g.

EXAMPLE 14

N-cyclopropyl-β-ethyl-3,4,5-trimethoxycinnamamide

The impure acid (11.1 g., approximately 0.0396 mole) obtained in Example 13 was dissolved in 100 ml. of dry benzene. To the resulting solution were added 15 g. (0.118 mole) of oxalyl chloride, and the mixture was warmed on a steam bath for about an hour. The benzene and unreacted oxalyl chloride were then removed by evaporation in vacuo with gentle warming on a steam bath. The crude acid chloride was then flushed with benzene several times until the odor of oxalyl chloride could no longer be detected.

The crude acid chloride thus obtained was dissolved in dry benzene, 5 g. (0.0877 mole) of cyclopropylamine were added, and the mixture was stirred overnight at room temperature.

The reaction product mixture was worked up as described in Example 2, and 10.4 g. of crude N-cyclopropyl-β-ethyl-3,4,5-trimethoxycinnamamide were obtained.

The crude amide, 5 g., was dissolved in 20 ml. of chloroform and chromatographed on 100 g. of silica contained in a 3 cm. diameter column, elution being effected with chloroform. The first main fraction off the column gave one spot in thin-layer chromatography. It was evaporated and the residue recrystallized from benzene-petroleum ether to yield white needles having a melting point of about 107–108° C. and identified by NMR as N-cyclopropyl-β-ethyl-3,4,5-trimethoxycinnamamide.

*Analysis.*—Calc.: C, 66.86; H, 7.59. Found: C, 66.74; H, 7.85.

We claim:
1. The cinnamic acid derivatives having the following structural formula:

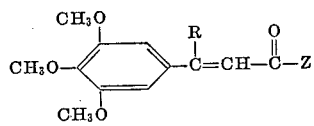

wherein R is an alkyl radical selected from the group consisting of methyl and ethyl; Z is

$R^1$, when taken alone, is selected from the group consisting of hydrogen and $C_1$–$C_3$ alkyl; $R^2$, when taken alone, is selected from the group consisting of $C_1$–$C_3$ alkyl, —$CH_2CH_2CH_2OCH_3$, cyclopropyl, and methylcyclopropyl.

2. N - cyclopropyl - β-methyl-3,4,5-trimethoxycinnamamide.
3. N - cyclopropyl - β-ethyl-3,4,5-trimethoxycinnamamide.
4. N-cyclopropyl-N-methyl-β-methyl-3,4,5-trimethoxycinnamamide.
5. N - cyclopropyl - N - isopropyl-β-methyl-3,4,5-trimethoxycinnamamide.

References Cited

UNITED STATES PATENTS

| 2,103,265 | 12/1937 | Lott | 260—559 X |
| 2,987,544 | 6/1961 | Horrom | 260—559 |

FOREIGN PATENTS 245,904  7/1963  Australia.

RICHARD K. JACKSON, *Primary Examiner.*
LORRAINE A. WEINBERGER, *Examiner.*
S. B. WILLIAMS, *Assistant Examiner.*